United States Patent
Salmi et al.

(10) Patent No.: US 7,289,921 B1
(45) Date of Patent: Oct. 30, 2007

(54) SYSTEM AND METHOD FOR PROVIDING AN IMPROVED VOLTAGE MONITOR FOR AN ADJUSTABLE SUPPLY VOLTAGE IN ADAPTIVE VOLTAGE SCALING

(75) Inventors: Pasi Salmi, Kemi (FI); Juha Pennanen, Oulu (FI)

(73) Assignee: National Semiconductor Corporation, Santa Clara, CA (US)

( * ) Notice: Subject to any disclaimer, the term of this patent is extended or adjusted under 35 U.S.C. 154(b) by 189 days.

(21) Appl. No.: 11/138,582

(22) Filed: May 26, 2005

(51) Int. Cl.
*G06F 15/00* (2006.01)
*G01R 35/00* (2006.01)

(52) U.S. Cl. .......................... 702/65; 702/107
(58) Field of Classification Search .......... 702/65, 702/79, 82, 89, 107, 182; 324/207.12, 657; 323/300, 282, 268; 363/65
See application file for complete search history.

(56) References Cited

U.S. PATENT DOCUMENTS

| | | | |
|---|---|---|---|
| 5,444,381 A * | 8/1995 | Locher et al. | 324/657 |
| 5,638,005 A * | 6/1997 | Rajan et al. | 324/751 |
| 6,548,991 B1 | 4/2003 | Maksimovic et al. | |
| 7,157,889 B2 * | 1/2007 | Kernahan et al. | 323/268 |

OTHER PUBLICATIONS

Yee William Li et al., "Asynchronous Datapath with Software-Controlled On-Chip Adaptive Voltage Scaling for Multirate Signal Processing Applications", Proceedings of the Ninth International Symposium on Asynchronous Circuits and Systems (ASYNC'03), 2003 IEEE.

Woonseok Kim et al., "Preemption-Aware Dynamic Voltage Scaling in Hard Real-Time Systems", Proceedings of the 2004 International Symposium on Low Power Electronics and Design (ISLPED'04), pp. 393-398.

Sandeep Dhar et al., "Switching Regulator with Dynamically Adjustable Supply Voltage for Low Power VLSI", IECON'01: The 27th Annual Conference of the IEEE Industrial Electronics Society, pp. 1874-1879.

* cited by examiner

*Primary Examiner*—Bryan Bui

(57) ABSTRACT

A system and method is disclosed for providing an improved voltage monitor that is capable of determining that a value of an adjustable supply voltage is suitable for a requested performance level in an adaptive voltage scaling system. An integrator circuit of the voltage monitor integrates a slack time error signal from a hardware performance monitor. Control circuitry evaluates a suitability of the integrated slack time error signal for the requested performance level for a number of voltage evaluation time periods. The adjustable supply voltage is deemed to be stable when the integrated slack time error signal is within a predetermined range of limits for at least two voltage evaluation time periods.

20 Claims, 7 Drawing Sheets

SYSTEM AND METHOD FOR PROVIDING AN IMPROVED VOLTAGE MONITOR FOR AN ADJUSTABLE SUPPLY VOLTAGE IN ADAPTIVE VOLTAGE SCALING

TECHNICAL FIELD OF THE INVENTION

The present invention relates generally to low power integrated circuits and, more particularly, to low power integrated circuits that employ multiple operating clock frequencies and adaptive voltage scaling.

BACKGROUND OF THE INVENTION

Modern digital integrated circuits such as central processing units (CPUs) are typically capable of operating with several different clock frequencies. Assume that a CPU can reduce its clock frequency while still meeting the processing requirements of an application that is running on the CPU. As is well known, a reduction in the clock frequency of the CPU proportionally reduces the CPU power consumption. With a lower clock frequency less power is consumed because there are fewer signal level changes within a given time period.

As is also well known, the power consumption of a digital circuit is quadratrically proportional to the operating voltage. Therefore, decreasing the voltage level of the operating voltage (i.e., the supply voltage) and reducing the clock frequency can provide significant power savings in a digital circuit.

Dynamic Voltage Scaling (DVS) is a power management technique in which pre-determined voltage values (within a voltage table) are used for each requested operating clock frequency of a CPU. The voltage levels that are defined in the voltage table must be carefully selected in order to adequately cover all process and temperature corners so that the CPU will function correctly at each clock frequency.

Adaptive Voltage Scaling (AVS) is a power management technique in which the supply voltage of a digital integrated circuit is adjusted automatically. The supply voltage is adjusted (using closed loop feedback) to a minimum level that is required for the proper operation of the integrated circuit at a given clock frequency.

The major difference between Dynamic Voltage Scaling (DVS) and Adaptive Voltage Scaling (AVS) is that the Adaptive Voltage Scaling (AVS) includes automatic variation of the process and temperature in order to balance the supply voltage and system delay (digital cell delay) that is due to closed loop feedback. This means that the supply voltage in the AVS system is automatically reduced at lower temperatures and for faster silicon. As the supply voltage is reduced, the power consumption is also reduced.

FIG. 1 illustrates a block diagram of an embodiment of an exemplary prior art Adaptive Voltage Scaling (AVS) System 100. AVS System 100 comprises a System-on-a-Chip (SoC) unit 110 and an Adaptive Voltage Scaling (AVS) Regulator 120. System-on-a-Chip (SoC) unit 110 comprises a Clock Management Unit (CMU) 130, a Variable Voltage Domain CPU System 140, a Hardware Performance Monitor (HPM) 150, and an Advanced Power Controller (APC) 160. The Hardware Performance Monitor (HPM) 150 is located within the Variable Voltage Domain CPU System 140.

The Clock Management Unit (CMU) 130 receives a system clock signal from a system clock unit (not shown). The Clock Management Unit (CMU) 130 provides clock frequencies for the central processing unit (CPU) (not separately shown) in the Variable Voltage Domain CPU System 140. The Clock Management Unit (CMU) 130 also provides clock frequencies for the Hardware Performance Monitor (HPM) 150. The clock frequencies that are provided to the Hardware Performance Monitor (HPM) 150 are represented by the designation "HPM CLOCK".

The Hardware Performance Monitor (HPM) 150 tracks gate delays in the current operational conditions. The Hardware Performance Monitor (HPM) 150 is in the Variable Voltage Domain CPU System 140. The Hardware Performance Monitor (HPM) outputs a performance code to the Advanced Power Controller (APC) 160. The performance code indicates the propagation delay of digital gate cells. The Advanced Power Controller (APC) 160 processes the delay data and requests appropriate changes to the supply voltage.

The Advanced Power Controller (APC) 160 is coupled to and communicates with the Adaptive Voltage Scaling (AVS) regulator 120. In one embodiment the coupling between the Advanced Power Controller (APC) 160 and the Adaptive Voltage Scaling (AVS) regulator 120 is a PowerWise™ interface (PWI). The mark PowerWise™ is a trademark of the National Semiconductor Corporation. The Advanced Power Controller (APC) 160 sends a request to the Adaptive Voltage Scaling (AVS) regulator 120 to change the supply voltage. The Adaptive Voltage (AVS) regulator 120 provides the requested supply voltage level to the SoC 110. The adjustable supply voltage from the Adaptive Voltage Scaling (AVS) regulator 120 is designated $V_{AVS}$ in FIG. 1.

The operating system of a modern central processing unit (CPU) may support a real time scheduling of performance levels. Each performance level has associated with it a specific value of operating clock frequency. The operating system is capable of selecting an operating clock frequency for which the CPU performance is minimized on a real time basis and for which the deadlines of a particular application are still met. For example, while an MPEG4 movie encoding application is running, a performance scheduling algorithm of the operating system may predict and change the performance level of the CPU in ten millisecond (10 ms) intervals.

The Hardware Performance Monitor (HPM) 150 tracks gate delays in the current operational conditions. The Hardware Performance Monitor (HPM) 150 outputs a performance code to the Advanced Power Controller 160. The performance code indicates the propagation delay of digital gate cells. In particular, Hardware Performance Monitor (HPM) 150 sends the performance code to the Advanced Power Controller 160. The Advanced Power Controller 160 then subtracts the performance code from a standard Reference Calibration Code (RCC) to obtain an error signal.

The error signal is referred to as "Slack Time". The Slack Time error signal comprises a digital error signal in a two's complement number format. If the Slack Time is positive an increase in voltage is required. If the Slack Time is negative a decrease in voltage is required. The Slack Time error signal is provided to a Compensation Unit (not shown) within the Advanced Power Controller 160. Based on the value of the Slack Time error signal, the Compensation Unit sends a signal to AVS Regulator 120 to cause AVS Regulator 120 to adjust the value of the adjustable output voltage ($V_{AVS}$) of AVS Regulator 120.

As previously mentioned, the CPU in an adaptive voltage scaling (AVS) system may change clock frequency within very short time intervals. For this reason, there is a need in the art for a reliable, noise tolerant system and method to detect a suitable adjustable supply voltage for a newly requested CPU clock frequency in an adaptive voltage scaling (AVS) system.

Specifically, there is a need in the art for an improved voltage monitor for an adaptive voltage scaling (AVS) system that is capable of determining that a value of an adjustable supply voltage is suitable for a newly requested performance level in an adaptive voltage scaling (AVS) system.

SUMMARY OF THE INVENTION

To address the above-discussed deficiencies of the prior art, it is a primary object of the present invention to provide an improved voltage monitor for an adaptive voltage scaling system.

An advantageous embodiment of the present invention comprises an improved voltage monitor that is capable of determining that a value of an adjustable supply voltage is suitable for a requested performance level in an adaptive voltage scaling system. An advantageous embodiment of the voltage monitor comprises an integrator circuit that integrates a slack time error signal that the integrator circuit receives from a hardware performance monitor of the adaptive voltage scaling system.

Control circuitry associated with the integrator circuit evaluates a suitability of the integrated slack time error signal for the requested performance level for a number of voltage evaluation time periods. The adjustable supply voltage is deemed to be stable when the integrated slack time error signal is within a predetermined range of limits for at least N voltage evaluation time periods where N is an integer. The predetermined range of limits comprises a predetermined upper limit and a predetermined lower limit. In one advantageous embodiment of the invention, the value of the integer N is two.

The control circuitry of the voltage monitor enables a voltage suitable flag (VDDOK flag) to indicate that the adjustable supply voltage is suitable for the new requested performance level. After the VDDOK flag is enabled, a clock management unit (CMU) of the adaptive voltage scaling (AVS) system enables a new requested clock frequency for the CPU of the adaptive voltage scaling (AVS) system.

It is an object of the present invention to provide a system and method for providing an improved voltage monitor for an adaptive voltage scaling (AVS) system.

It is another object of the invention to provide a system and method for providing an improved voltage monitor for an adaptive voltage scaling (AVS) system that is capable of determining that a value of an adjustable supply voltage is suitable for a requested performance level in the adaptive voltage scaling (AVS) system.

It is yet another object of the present invention to provide a system and method for providing an improved voltage monitor for an adaptive voltage scaling (AVS) system that is capable of evaluating a suitability of an integrated slack time error signal for at least N voltage evaluation time periods and determining that the integrated slack time error signal is within a predetermined range of limits for at least N voltage evaluation time periods.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should e noted that the functionality associated with any particular controller may be centralized or distributed, whether locally or remotely. Definitions for certain words and phrases are provided throughout this patent document, those of ordinary skill in the art should understood that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 2 through 7, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged adaptive voltage scaling (AVS) system.

Figure 1:
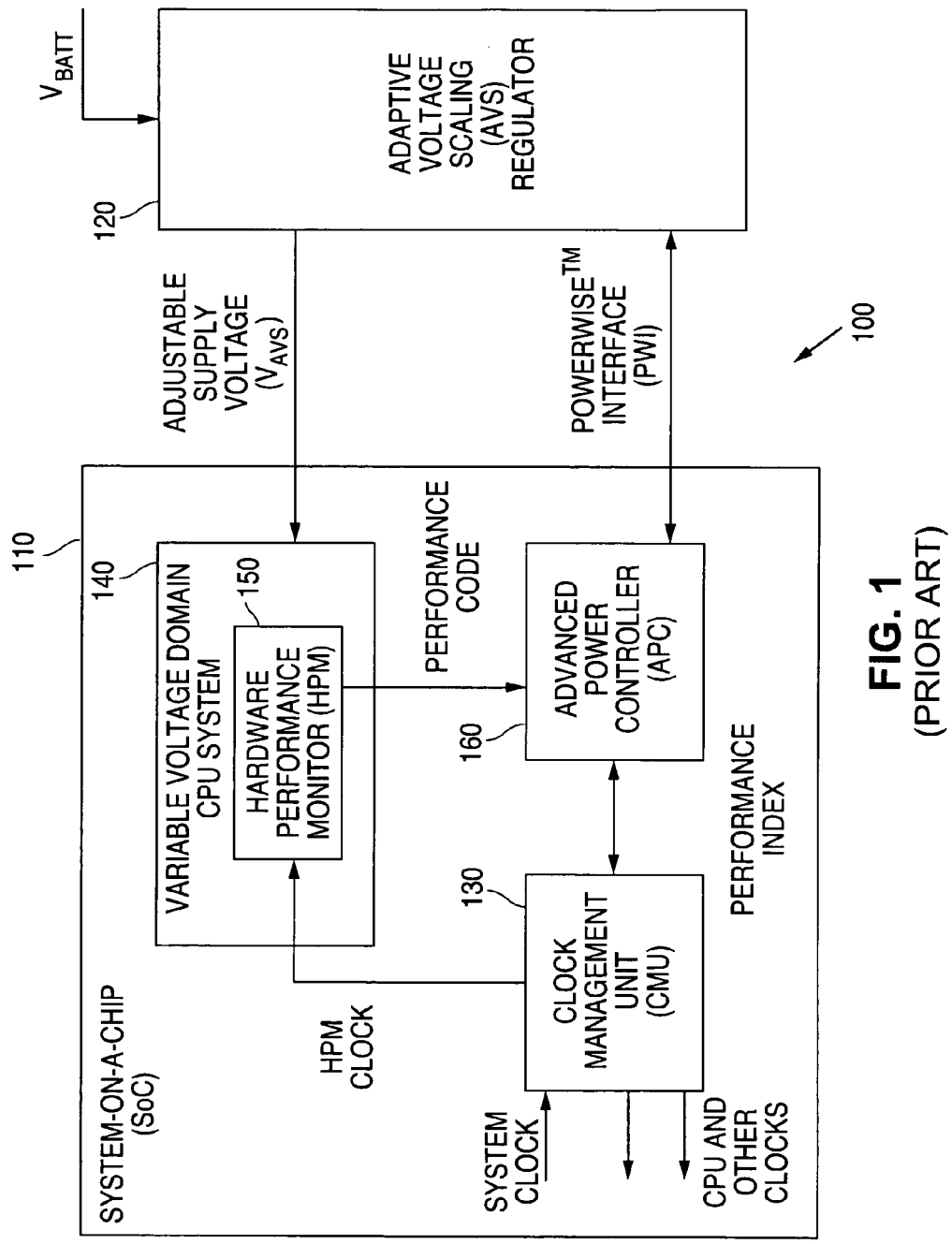
FIG. 1 is a block diagram illustrating an exemplary prior art adaptive voltage scaling (AVS) system.
Figure 2:
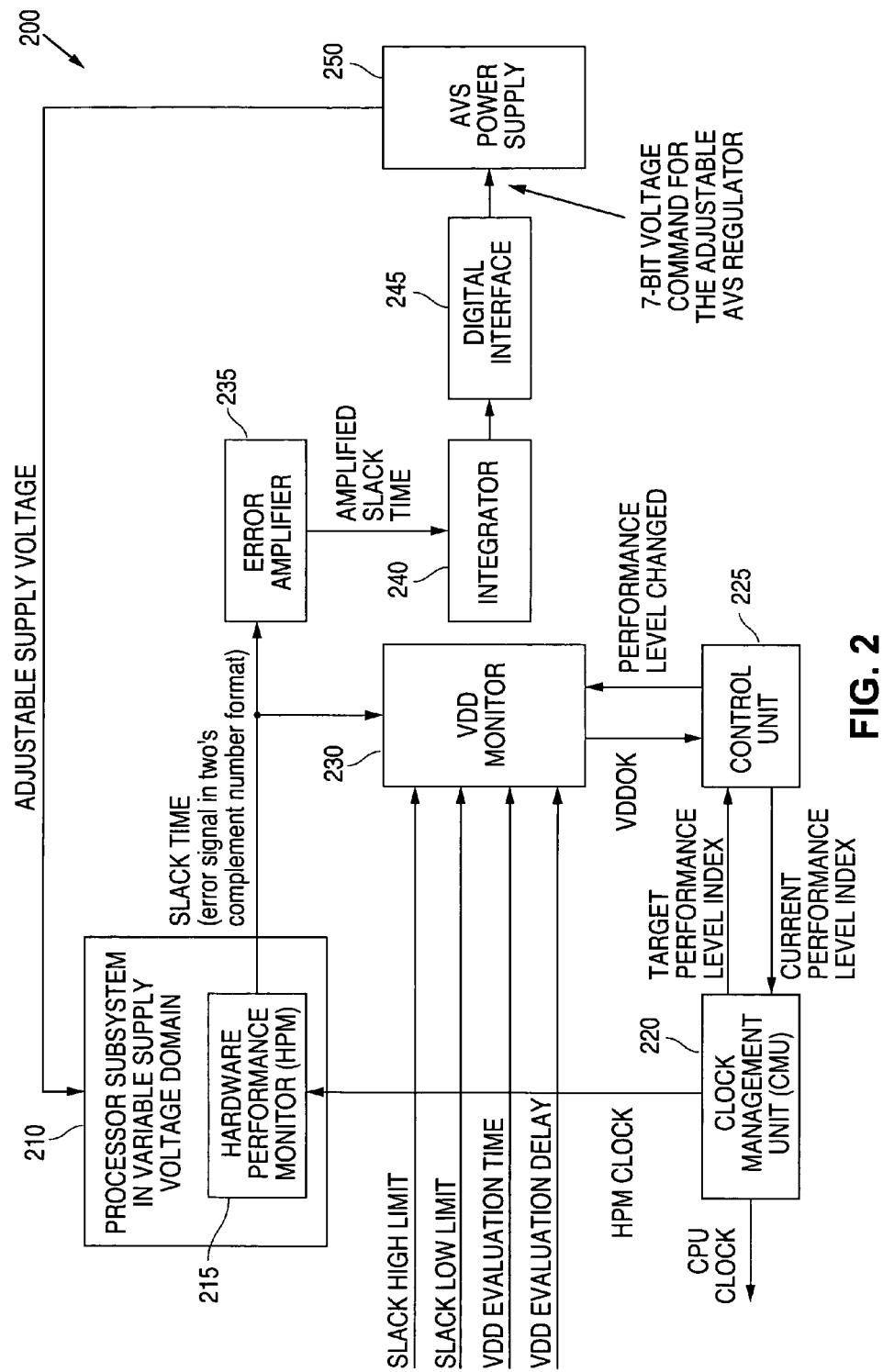
FIG. 2 is a block diagram illustrating an advantageous embodiment of an adaptive voltage scaling (AVS) system of the present invention.

FIG. 2 illustrates a block diagram illustrating an advantageous embodiment of an adaptive voltage scaling (AVS) system 200 of the present invention. AVS System 200 comprises a Processor Subsystem in Variable Supply Voltage Domain 210, Hardware Performance Monitor (HPM) 215, Clock Management Unit (CMU) 220, Control Unit 225, Voltage Monitor 230 (also referred to as VDD Monitor 230), Error Amplifier 235, Integrator 240, and Digital Interface 245. AVS System 200 also comprises an Adaptive Voltage Scaling (AVS) Regulator 250 (also referred to as AVS Power Supply 250). The various elements of AVS System 200 are coupled together as shown in FIG. 2.

Clock Management Unit 220 receives a system clock signal (not shown in FIG. 2) from a system clock (also not shown in FIG. 2). Clock Management Unit 220 provides clock frequencies for the central processing unit (CPU) (not shown in FIG. 2). The clock frequencies that are provided to the CPU are represented by the designation "CPU Clock".

Clock Management Unit 220 also provides clock frequencies for the Hardware Performance Monitor (HPM) 215 that is located within the Processor Subsystem in Variable Supply Voltage Domain 210. The clock frequencies that are provided to the Hardware Performance Monitor (HPM) 215 are represented by the designation "HPM Clock".

Clock Management Unit 220 is also coupled to Control Unit 225. Clock Management Unit 220 contains handshaking logic circuitry that is capable of requesting and acknowledging a new operating frequency from the AVS system 200. Clock Management Unit 220 is capable of providing a target performance level index to Control Unit 225. Clock Management Unit 220 is also capable of receiving the current performance level index from Control Unit 225. Control Unit 225 provides control signals to make state transitions during operation of AVS system 200.

The Hardware Performance Monitor (HPM) 215 tracks gate delays in the current operational conditions. The Hardware Performance Monitor (HPM) 215 outputs a performance code that indicates the propagation delay of digital gate cells. The difference between a calibrated reference code in the Hardware Performance Monitor (HPM) 215 and the performance code is an error signal that is referred to as "Slack Time". The Slack Time error signal comprises a digital error signal in a two's complement number format. If the Slack Time is positive an increase in voltage is required. If the Slack Time is negative a decrease in voltage is required.

As shown in FIG. 2, the Hardware Performance Monitor (HPM) 215 outputs the Slack Time error signal to VDD Monitor 230 and to Error Amplifier 235. VDD Monitor 230 is also coupled to Control Unit 225. VDD Monitor 230 evaluates the suitability of supply voltage for the requested performance level. If the supply voltage is suitable, VDD Monitor 230 enables a signal on a VDDOK signal line to Control Unit 225. VDD Monitor 230 is also capable of receiving a signal from Control Unit 225 indicating that the performance level has changed.

VDD Monitor 230 also receives signals on four input lines. The first input line is designated "Slack High Limit." The second input line is designated "Slack Low Limit." The third input line is designated "VDD Evaluation Time." The fourth input line is designated "VDD Evaluation Delay." The operation of VDD Monitor 230 using signals on these signal lines will be described more fully later in this patent document.

Error Amplifier 235 receives and amplifies the Slack Time error signal from Hardware Performance Monitor (HPM) 215. The amplified Slack Time error signal from Error Amplifier 235 is provided to Integrator 240. Integrator 240 integrates the amplified Slack Time Error at each clock cycle. In the advantageous embodiment illustrated in FIG. 2, the seven (7) top bits of a computer word represent the voltage level. Integrator 240 sends the bits that represent the voltage level to Digital Interface 245. Digital Interface 245 creates a serial seven (7) bit voltage command and sends the command to the AVS Regulator 250.

AVS Regulator 250 provides an adjustable (i.e., variable) supply voltage to the CPU system and to the Hardware Performance Monitor (HPM) 215. In the advantageous embodiment illustrated in FIG. 2, AVS Regulator 250 provides the adjustable supply voltage signal to the Processor Subsystem in Variable Supply Voltage Domain 210. AVS Regulator 250 comprises circuitry (not shown) that generates and provides the adjustable supply voltage to the CPU system and to the Hardware Performance Monitor (HPM) 215.

When the AVS System 200 requests a higher performance level, the voltage for the requested voltage level is retrieved from a voltage table (not shown) in Integrator 240. When the AVS System 200 operates in a stable state (i.e., the CPU performance level is not being changed), the voltage level is stored continuously to a register (not shown) in Integrator 240 with an address that corresponds to the current performance level. In this manner, the voltage level for each performance level is adjusted adaptively for the next performance level whose address request matches the current performance level.

AVS system 200 operates in three different states depending on whether (1) the CPU has requested a higher performance level, or (2) the CPU has requested a lower performance level, or (3) the CPU has not requested a change in the performance level. When the CPU needs to operate at a different clock frequency, the CPU requests a new performance level.

A. The CPU Requests A Higher Performance Level.

When the CPU load is high the CPU may request a higher performance level. A higher clock frequency always requires a higher supply voltage. Therefore, the supply voltage must first be increased before the higher clock frequency can be enabled for the CPU. The supply voltage level is increased by first enabling the higher frequency to the Hardware Performance Monitor (HPM) 215. Then an evaluation is made to determine whether the voltage level is sufficient for the requested frequency. When the CPU requests a higher performance level, two parallel processes start to operate.

First, a register value that represents a higher voltage level is fetched from the voltage table (not shown) in Integrator 240 and is sent to AVS Regulator 250 via Digital Interface 245. This results in a rapid increase in the supply voltage level. Due to increased frequency, the Hardware Performance Monitor (HPM) 215 outputs a highly positive Slack Time error signal. After a short delay (designated "VDD Evaluation Delay"), further processing of the Slack Time error signal (i.e., integration) begins. This results in fine adjustments to the supply voltage level (i.e., the adjustable supply voltage level).

Second, voltage monitoring (in VDD Monitor 230) is activated during the voltage transient. The settable delay (i.e., "VDD Evaluation Delay") determines the time when the VDD monitoring process begins. When the settable delay expires, the voltage monitor (VDD Monitor 230) starts to evaluate the suitability of the Slack Time error signal for the requested performance level. VDD Monitor 230 evaluates the Slack Time error signal in short periods. The time period is defined using the "VDD Evaluation Time" setting. When two (or more) evaluation periods are successful, it is assumed that the supply voltage level (VDD) is stable. VDD Monitor 230 then enables the VDDOK signal on the VDDOK signal line to Control Unit 225. The Clock Management Unit (CMU) then enables the requested clock frequency for the CPU.

B. The CPU Requests A Lower Performance Level.

When the CPU load is low the CPU may request a lower performance level. Because the currently available voltage level is always suitable for the lower clock frequency, the currently available voltage level is immediately enabled for the CPU. When the CPU requests a lower performance level, two parallel processes start to operate.

First, due to the lowered clock frequency on the "HPM Clock" signal line, the Hardware Performance Monitor (HPM) 215 outputs a highly negative Slack Time error signal. As the Slack Time error signal is further processed (by integration), the result is a rapid decrease in the supply voltage level. Note that the voltage is not fetched from the voltage table (not shown) in Integrator 240 when the performance level is lowered.

Second, voltage monitoring (in VDD Monitor 230) is activated during the voltage transient. The settable delay (i.e., "VDD Evaluation Delay") determines the time when the VDD monitoring process begins. When the settable delay expires, the voltage monitor (VDD Monitor 230) starts to evaluate the suitability of the Slack Time error signal for the requested performance level. VDD Monitor 230 evaluates the Slack Time error signal in short periods. The time period is defined using the "VDD Evaluation Time" setting. When two (or more) evaluation periods are successful, it is assumed that the supply voltage level (VDD) is stable. VDD Monitor 230 then enables the VDDOK signal on the VDDOK signal line to Control Unit 225.

C. The CPU Does Not Request Different Performance Level

As previously mentioned, when the AVS System 200 operates in a stable state (i.e., the CPU performance level is not being changed), the voltage level is stored continuously to a register (not shown) in Integrator 240 with an address that corresponds to the current performance level.

Figure 3:
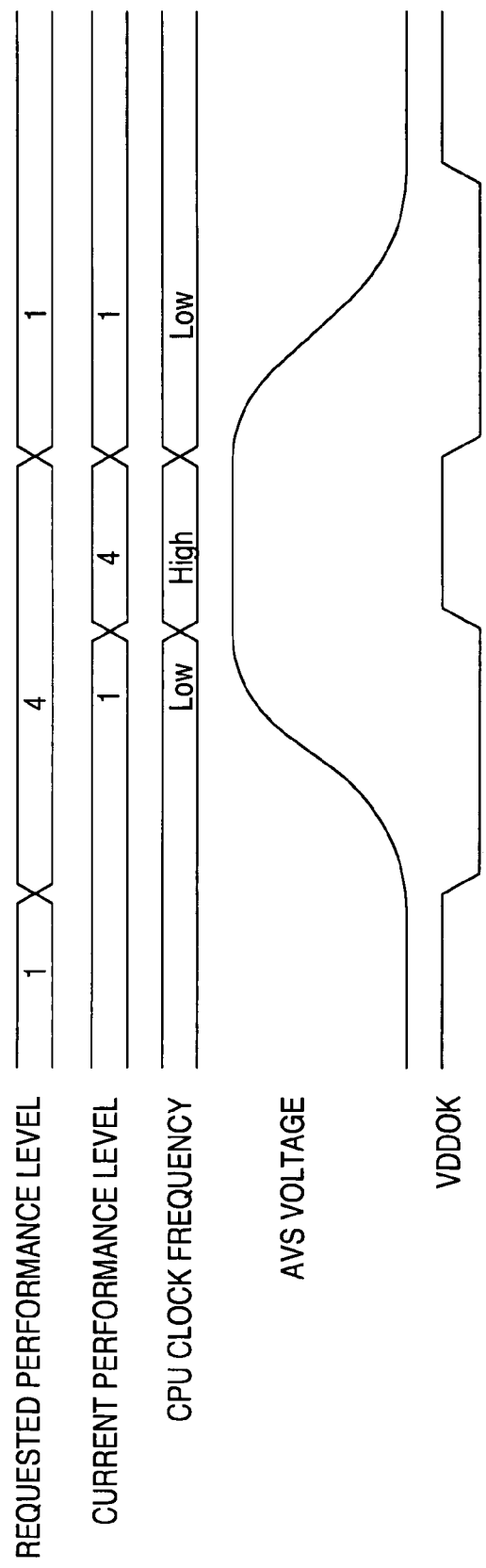
FIG. 3 is a timing diagram illustrating a performance level change in an adaptive voltage scaling (AVS) system of the present invention.

FIG. 3 is a timing diagram illustrating how a process of adaptive voltage scaling (AVS) increases an AVS voltage level in accordance with the principles of the present invention. At first the requested performance level signal is "low" (designated by numeral "1") and the current performance level signal is "low (also designated by numeral "1"). Also at first the CPU clock frequency is "Low" and the AVS voltage is at low voltage level. Also at first the VDDOK signal is enabled.

The CPU then requests a higher performance level. This causes the requested performance level signal to go "high" (designated by numeral "4"). The VDDOK signal is disabled. The AVS voltage quickly increases to the requested higher level of voltage.

After the AVS voltage (VDD) reaches the requested higher level of voltage and the optimum voltage level is found, the VDD monitor 230 enables the VDDOK signal. Then the CPU clock frequency signal goes from a "Low" level to a "High" level and the current performance level signal goes from a "low" level (designated by numeral "1") to a "high" level (designated by numeral "4"). In this manner AVS System 200 rapidly increases the AVS voltage level to the new requested higher voltage level.

The timing diagrams in FIG. 3 also illustrate the changes that occur when the AVS voltage is "high" and the CPU requests a lower performance level. The requested performance level signal for the "high" level (designated by numeral "4") is disabled and the requested performance level signal for the "low" level (designated by numeral "1") is enabled. The current performance level signal for the "high" level of performance (designated by numeral "4") is disabled and the current performance level signal for the "low" level of performance (designated by numeral "1") is enabled. The CPU clock frequency for the "High" level is disabled and the CPU clock frequency for the "Low" level is enabled.

The VDDOK signal is disabled. The AVS mode remains enabled. The AVS voltage begins to decrease to the requested lower level of voltage. After the AVS voltage (VDD) reaches the requested lower level of voltage, the VDDOK signal is enabled. The AVS voltage level slowly stabilizes at the requested lower level of voltage.

Figure 4:
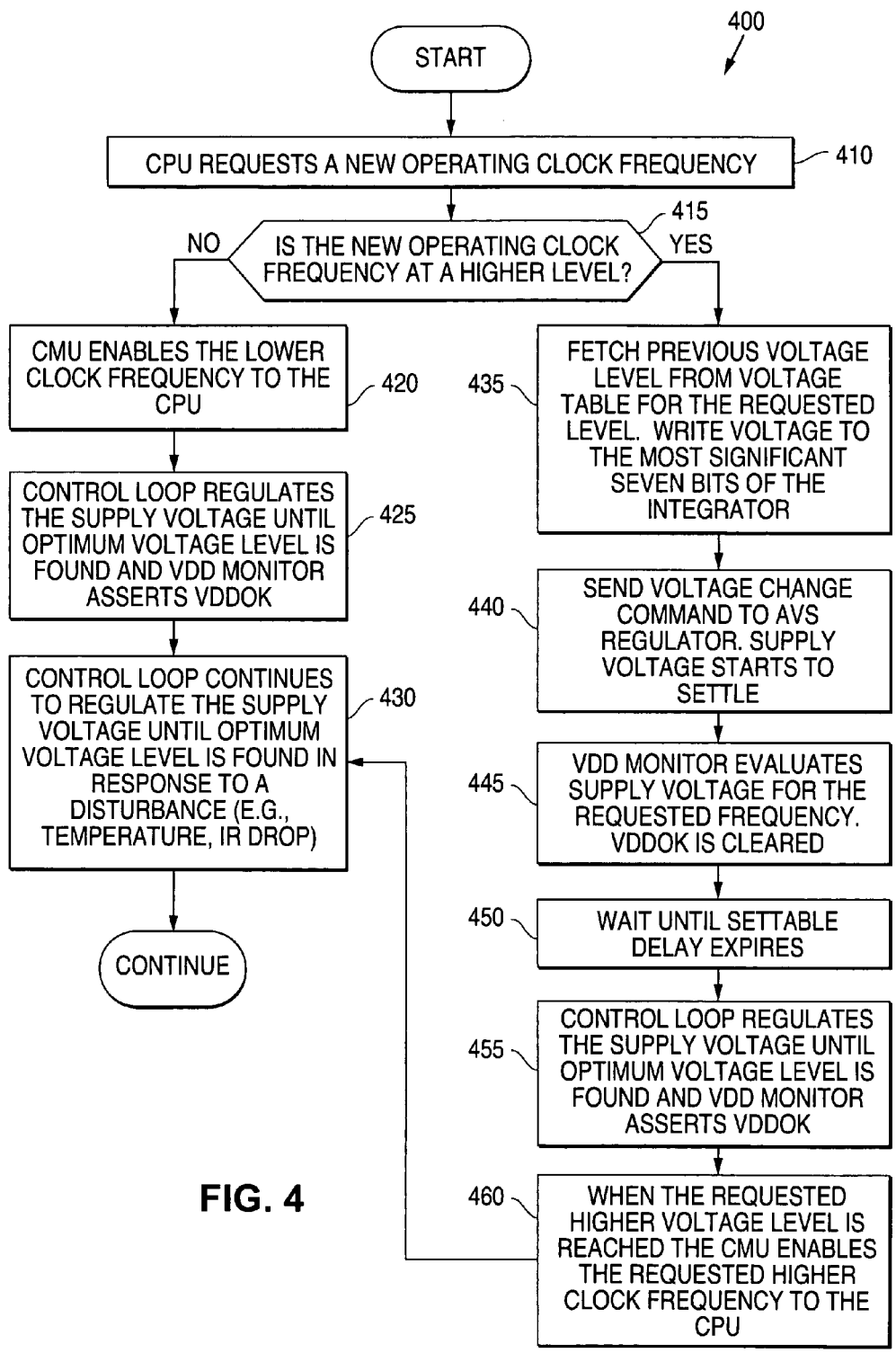
FIG. 4 is a flow chart illustrating an advantageous embodiment of a method of the present invention.

FIG. 4 is a flow chart 400 illustrating an advantageous embodiment of a method of the present invention. In the first step the CPU requests a new operating clock frequency (step 410). A decision is then made to determine whether the new operating clock frequency is at a higher level (decision step 415). If the requested new operating clock frequency is not at a higher level, the Clock Management Unit (CMU) 220 enables the lower clock frequency to the CPU (step 420). Then the control loop regulates the supply voltage until the optimum voltage level is found and the VDD Monitor 230 asserts the VDDOK signal (step 425).

The control loop of the AVS system 200 continues to regulate the supply voltage until the optimum voltage level is found in response to a disturbance (e.g., temperature, IR voltage drop) (step 430). Then the method steps continue.

Returning to step 415, if the requested new operating clock frequency is at a higher level, then the AVS System 200 fetches the previous voltage level from the voltage table (not shown) of Integrator 240 for the requested level. The voltage value is written to the seven Most Significant Bits (MSB) of the Integrator 240 (step 435). Then the voltage change command is sent to AVS Regulator 250. The value of the supply voltage starts to settle (step 440). Then VDD Monitor 230 evaluates the supply voltage for the requested frequency and clears the VDDOK signal (step 445). Then AVS System 200 waits for the settable delay period to expire (step 450). During this time the supply voltage goes toward the requested voltage level.

Then the control loop regulates the supply voltage until the optimum voltage level is found and the VDD Monitor 230 asserts the VDDOK signal (step 455). When the requested higher voltage level is reached, the Clock Management Unit (CMU) 220 enables the requested higher clock frequency to the CPU (step 460). Then control passes to step 430. The control loop of the AVS system 200 continues to regulate the supply voltage until the optimum voltage level is found in response to a disturbance (e.g., temperature, IR voltage drop) (step 430). Then the method steps continue.

Figure 5:
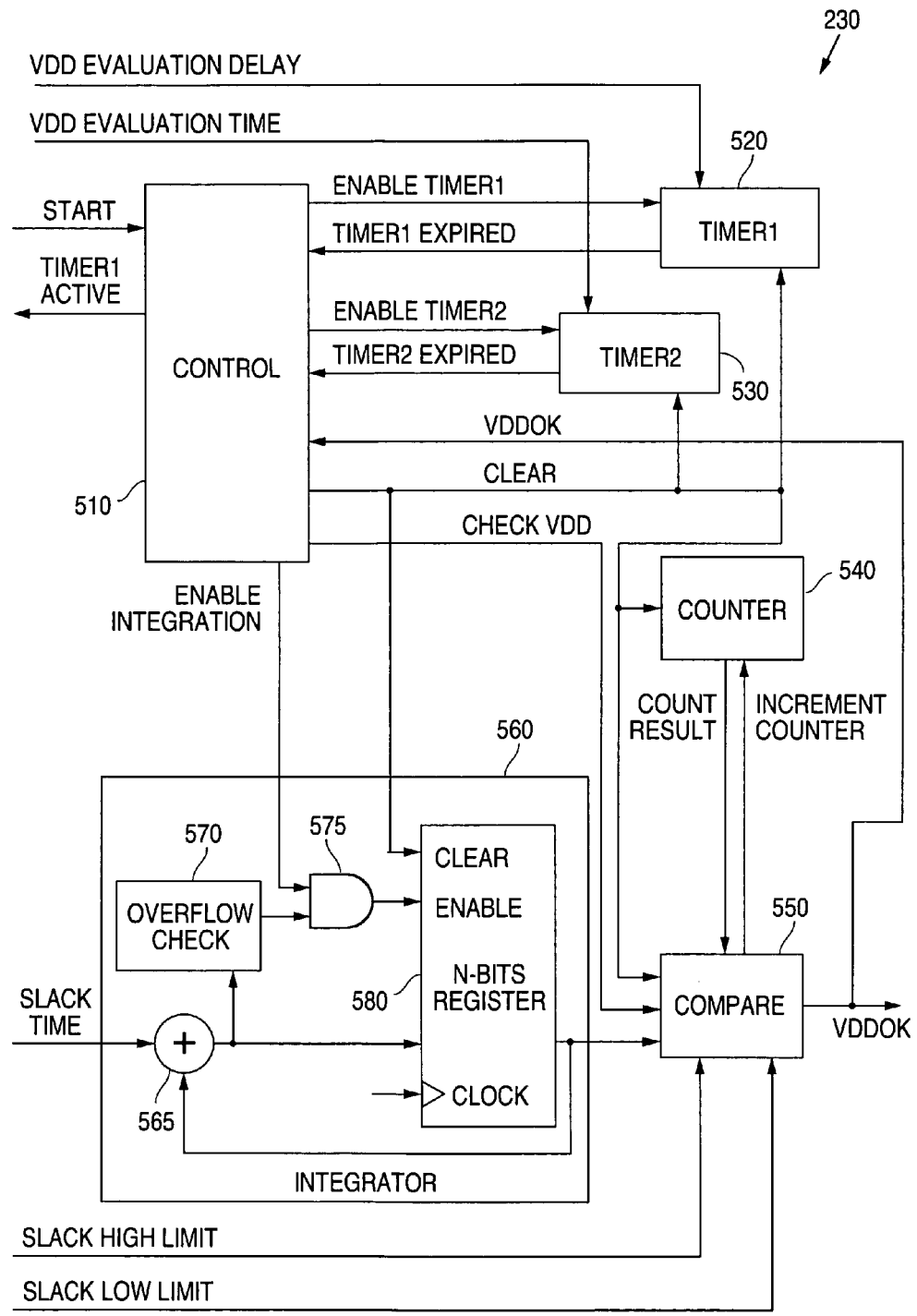
FIG. 5 is a block diagram illustrating an advantageous embodiment of a voltage monitor for an adaptive voltage scaling (AVS) system in accordance with the principles of the present invention.

FIG. 5 is a block diagram illustrating an advantageous embodiment of voltage monitor 230 (VDD Monitor 230) in accordance with the principles of the present invention. VDD Monitor 230 comprises a Control state machine 510, a first timer 520 (also referred to as Timer 1 520), a second timer 530 (also referred to as Timer 2 530), a Counter unit 540, a Compare unit 550, and an Integrator 560. The elements of VDD Monitor 230 are coupled together as shown in FIG. 5.

As also shown in FIG. 5, Integrator 560 comprises a Summation unit 565, and Overflow Check unit 570, a logical AND gate 575, and an N-bits register 580. The elements of Integrator 560 are coupled together as shown in FIG. 5.

VDD Evaluation Delay signal line is coupled to a first input of Timer 1 520. VDD Evaluation Time signal line is coupled to a first input of Timer 2 530. Slack High Limit signal line is coupled to a first input of Compare unit 550. Slack Low Limit signal line is coupled to a second input of Compare unit 550. Slack Time signal line is coupled to a first input of Summation unit 565 of Integrator 560. A signal line designated "Start" is coupled to an input of Control state machine 510. A signal line designated "Timer 1 Active" is also coupled to an output of Control state machine 510.

A signal line designated "Enable Timer 1" is coupled from an output of Control state machine 510 to a second input of Timer 1 520. A signal line designated "Timer 1 Expired" is coupled from an output of Timer 1 520 to a second input of Control state machine 510. A signal line designated "Enable Timer 2" is coupled from an output of Control state machine 510 to a second input of Timer 2 530. A signal line designated "Timer 2 Expired" is coupled from an output of Timer 2 530 to a third input of Control state machine 510.

A signal line designated "Clear" is coupled to a third input of Timer 1 520 and to a third input of Timer 2 530. The "Clear" signal line is also coupled to a first input of Counter unit 540 and to a third input of Compare unit 550. The "Clear" signal line is also coupled to a "Clear" input of N-bits register 580 of Integrator 560.

A signal line designated "Enable Integration" is coupled from an output of Control state machine 510 to a first input of logical AND gate 575 of Integrator 560. During the operation of Integrator 560 a Slack Time error signal is provided on Slack Time signal line to a first input of Summation unit 565. An output signal from N-bits register 580 is provided to a second input of Summation unit 565. The summation output of Summation unit 565 is provided to an input of N-bits register 580 and to Overflow check unit 570. The output of Overflow check unit 570 is provided to a second input of logical AND gate 575 of Integrator 560. The output of logical AND gate 575 is provided to an Enable input of N-bits register 580.

The output signal from N-bits register 580 is provided as the output of Integrator 560 to a fourth input of Compare unit 550. A signal line designated "Check VDD" from Control state machine 510 is coupled to a fifth input of Compare unit 550. A signal line designated "Increment counter" from Compare unit 550 is coupled to a second input of Counter unit 540. A signal line designated "Count result" is coupled from an output of Counter unit 540 to a sixth input of Compare unit 550. The output of Compare unit 550 is the VDDOK signal. The VDDOK output signal is also fed back to Control state machine 510 on a signal line that is designated "VDDOK".

When the CPU requests a new performance level (and a new clock operating frequency), the Control state machine 510 clears the VDDOK output signal, resets the counters, and initializes Timer 1 520 and Timer 2 530. Control state machine 510 sends a signal to Timer 1 520 on signal line "Enable Timer 1" to start Timer 1 520 counting. Timer 1 520 counts the elapsed time until the elapsed time exceeds the VDD Evaluation Delay time. Timer 1 520 then sends a signal back to Control state machine 510 on signal line "Timer 1 Expired" informing the Control state machine 510 that the time set for Timer 1 520 has expired.

When Timer 1 520 stops, the Control state machine 510 enables Integrator 560 to perform evaluation of the supply voltage. In cases where the CPU requests a higher performance level, the adaptive voltage scaling (AVS) control loop is disabled (i.e., the Integrator 240 is not active) when Timer 1 520 is running.

When Timer 1 520 stops, the Control state machine 510 also enables Timer 2 530. Control state machine 510 sends a signal to Timer 2 530 on signal line "Enable Timer 2" to start Timer 2 530 counting. Timer 2 530 counts the elapsed time until the elapsed time exceeds the VDD Evaluation Time. Timer 2 530 then sends a signal back to Control state machine 510 on signal line "Timer 2 Expired" informing the Control state machine 510 that the time set for Timer 2 530 has expired.

Timer 2 530 sets the time of the evaluation period for the adjustable supply voltage. An evaluation time period is typically between five microseconds (5 μsec) and twenty microseconds (20 μsec). Two or more measuring periods must be successfully passed in order to enable the "voltage suitable" signal (i.e., the VDDOK signal). If a measuring period is not successful, then the count of the successfully measured periods is cleared, and the next evaluation period is begun.

The Slack Time error signal from the Hardware Performance Monitor (HPM) 215 (not shown in FIG. 5) is integrated in Integrator 560 during the time that Timer 2 530 is running. The result is a cumulative Slack Time. The Slack Time sample for the current clock cycle is summed to the previous Slack Time sample.

When the time that is set for Timer 2 530 expires, the result of the integration performed by Integrator 560 is checked in Compare unit 550. For a successful evaluation, the result of the integration must be below the value of the Slack High Limit and above the value of the Slack Low Limit. If the result of the integration fails either of these conditions, then the result is cleared (i.e., discarded) and the associated logic is cleared.

If the result of the integration is below the value of the Slack High Limit and above the value of the Slack Low Limit, then the evaluation is successful. Then the count of successful integrations in Counter unit 540 is incremented. The Compare unit 550 sends a signal to Counter unit 540 on the "Increment counter" signal line to increment the count of successful integrations. The Counter unit 540 sends the count result to the Compare unit 550 on the "Count result" signal line.

When the count of the number of successful integrations exceeds a preset limit of N successful integrations, then the Compare unit 550 asserts the "voltage suitable" signal (i.e., the VDDOK signal) on the VDDOK signal line.

Figure 6:
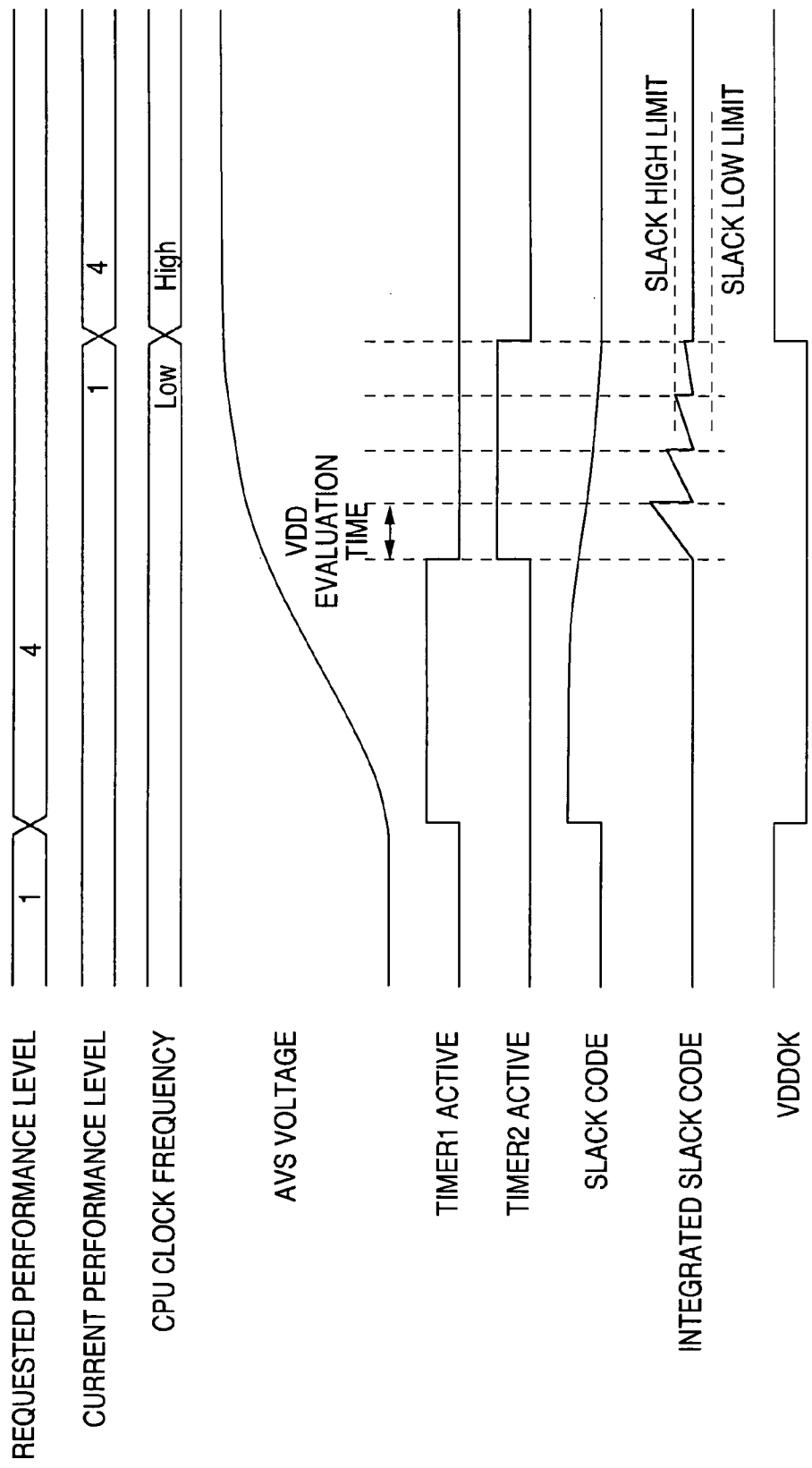
FIG. 6 is a timing diagram illustrating a performance level change in an adaptive voltage scaling (AVS) system in accordance with an advantageous embodiment of a method of the present invention.

FIG. 6 is a timing diagram illustrating how a process of adaptive voltage scaling (AVS) increases an AVS voltage level in accordance with the principles of the present invention. At first the requested performance level signal is "low" (designated by numeral "1") and the current performance level signal is "low (also designated by numeral "1"). Also at first the CPU clock frequency is "Low" and the AVS voltage is at low voltage level. Also at first the VDDOK signal is enabled.

The CPU then requests a higher performance level. This causes the requested performance level signal to go "high" (designated by numeral "4"). The VDDOK signal is disabled. The AVS voltage begins to increase to the requested higher level of voltage. Timer 1 520 begins to count. This is shown by the high level of the signal "Timer 1 active" in FIG. 6.

After Timer 1 520 expires, the VDD evaluation period begins. The level of the signal on "Timer 1 Active" goes low and the level of the signal on "Timer 2 Active" goes high. The time period "VDD Evaluation Time" determines the time during which the evaluation is made. During an evaluation time, a cumulative sum of the Slack Time error signal is made by summing the value of the "Slack code" to the previous value of the "Slack code" at each clock cycle (i.e., by integration). The "Slack code" and the "Integrated slack code" signals are shown in the timing diagram of FIG. 6.

At each time when the "VDD Evaluation Time" expires, the result of the integration is checked by comparing it to the settable high and low limits. If the result is not between the limits, then the counters are cleared and the evaluation is period is restarted. The evaluation period is successful if the result of the integration is between the limits.

The VDD monitor 230 asserts the VDDOK signal if two (2) consecutive evaluation periods are successful (i.e., between the limits for two clock cycles). Then the level of the signal on "Timer 2 Active" goes low. Then the CPU clock frequency signal goes from a "Low" level to a "High" level and the current performance level signal goes from a "low" level (designated by numeral "1") to a "high" level (designated by numeral "4"). In this manner AVS System 200 increases the AVS voltage level to the new requested higher voltage level.

Figure 7:
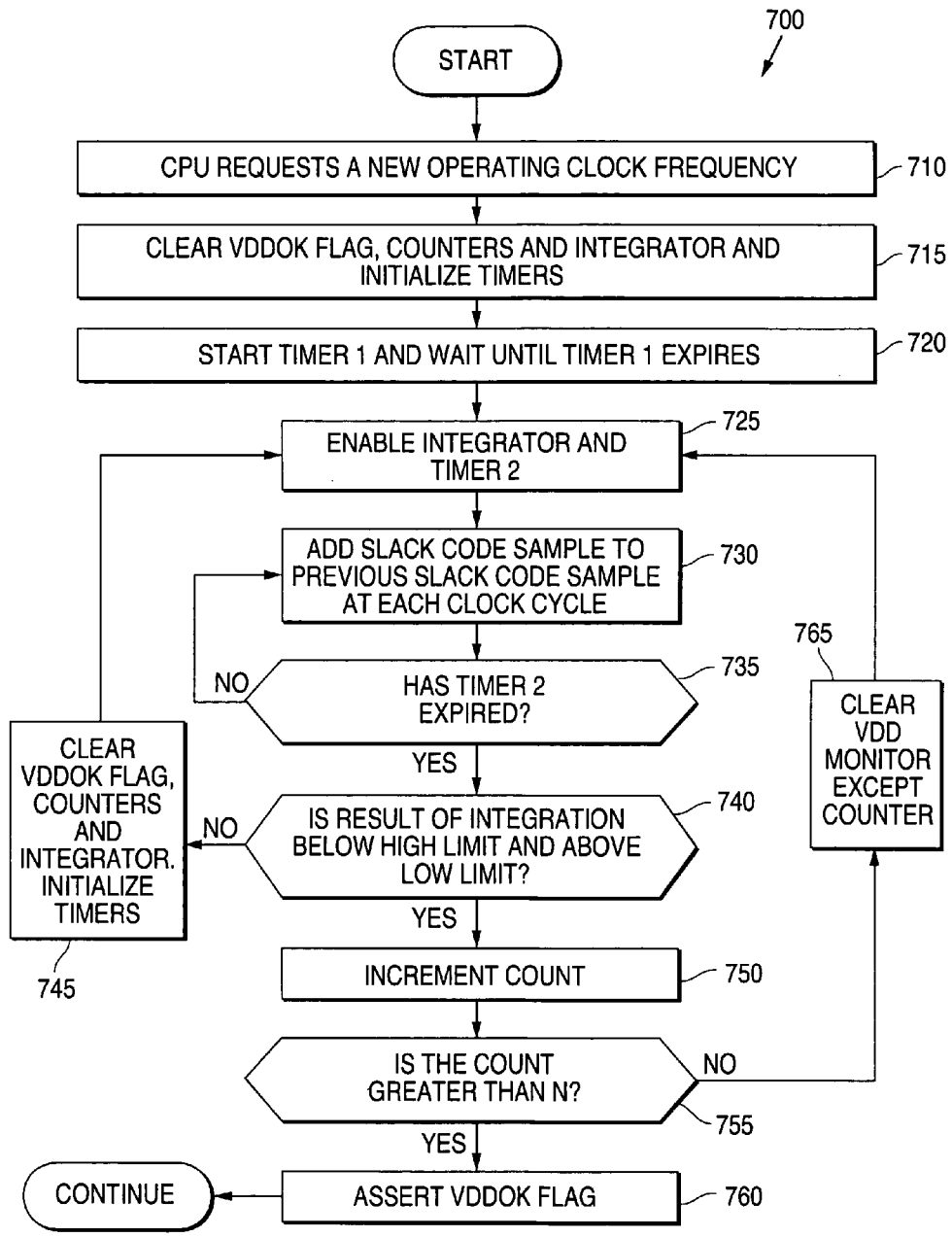
FIG. 7 is a flow chart illustrating an advantageous embodiment of a method of the present invention.

FIG. 7 is a flow chart 700 illustrating an advantageous embodiment of a method of the present invention. In the first step the CPU requests a new operating clock frequency (step 710). Control state machine 510 clears the VDDOK flag, and clears the counters in Counter unit 540, and clears Integrator 560, and initializes the timers (Timer 1 520 and Timer 2 530) (step 715). Timer 1 520 is enabled and starts counting. Then the process waits for the expiration of the time period of Timer 1 520 (step 720).

Then Control state machine 510 enables Integrator 560 and enables Timer 2 530 (step 725). Then the value of the "Slack code" is summed to the previous value of the "Slack code" at each clock cycle (by integration) (step 730). This process continues as long as Timer 2 530 has not expired (decision step 735). When the time period of Timer 2 530 expires, then a determination is made whether the summed (integrated) value of "Slack code" is within the preset limits. That is, a determination is made whether the result of the integration is below the high limit ("Slack High Limit") and above the low limit ("Slack Low Limit") (decision step 740).

If the result of the integration is not within the limits, then the Control state machine 510 clears the VDDOK flag, and clears the counters in Counter unit 540, and clears Integrator 560, and initializes the timers (Timer 1 520 and Timer 2 530) (step 745). Then the control is passed to step 725. The method then executes step 725 and continues from that step.

If the result of the integration is within the limits, then the Compare unit 550 sends an "Increment counter" signal to Counter unit 540 and Counter unit 540 increments the count of successful evaluation periods (step 750).

A determination is then made whether the count is greater than a preselected count number N. In one advantageous embodiment, the preselected count number N is equal to two (2). If the count is not greater than the preselected count number N, then the elements of VDD Monitor 320 are cleared except for the count in Counter unit 540 (step 765). Then the control is passed to step 725. The method then executes step 725 and continues from that step.

If the count is greater than the preselected count number N, then the Compare unit 550 asserts the VDDOK signal (step 760) and the process continues. In this manner VDD Monitor 230 asserts the VDDOK signal if there are N consecutive successful evaluation periods.

Although the present invention has been described with several embodiments, various changes and modifications may be suggested to one skilled in the art. It is intended that the present invention encompass such changes and modifications as fall within the scope of the appended claims.

What is claimed is:

1. A voltage monitor that determines a value of an adjustable supply voltage is suitable for a requested performance level in an adaptive voltage scaling (AVS) system, said voltage monitor comprising:
   an integrator circuit that integrates a slack time error signal from a hardware performance monitor of said adaptive voltage scaling (AVS) system; and
   circuitry for evaluating a suitability of said integrated slack time error signal for said requested performance level for at least N voltage evaluation time periods where N is an integer.

2. The voltage monitor as set forth in claim 1 wherein said circuitry for evaluating said suitability of said integrated slack time error signal enables a voltage suitable VDDOK flag when said integrated slack time error signal is within a predetermined range of limits for at least N voltage evaluation time periods where N is an integer.

3. The voltage monitor as set forth in claim 2 wherein said predetermined range of limits comprises a predetermined upper limit and a predetermined lower limit.

4. The voltage monitor as set forth in claim 2 wherein a value of said integer N is two.

5. The voltage monitor as set forth in claim 2 wherein said circuitry for evaluating said suitability of said integrated slack time error signal comprises:
   a control state machine capable of enabling an operation of said integrator circuit;
   a first timer associated with said control state machine;
   a second timer associated with said control state machine;
   a compare unit associated with said control state machine wherein said compare unit receives an output signal from said integrator circuit; and
   a counter unit associated with said control state machine and with said compare unit.

6. The voltage monitor as set forth in claim 5 wherein said first timer counts a settable delay period VDD Evaluation Delay from a point in time when said control state machine receives a signal requesting a new performance level until a point in time when said control state machine enables said integrator circuit to begin integrating said slack time error signal.

7. The voltage monitor as set forth in claim 6 wherein said second timer counts a period of time VDD Evaluation Time during which said integrator circuit performs an integration of said slack time error signal.

8. The voltage monitor as set forth in claim 7 wherein said compare unit determines whether said output signal from said integrator circuit that represents said integrated slack time error signal after said VDD Evaluation Time has elapsed is within a predetermined range of limits.

9. The voltage monitor as set forth in claim 8 wherein said compare unit causes said counter unit to increment a count when said integrated slack time error signal is within said predetermined range of limits and wherein said count records how many successful voltage evaluation time periods have occurred.

10. The voltage monitor as set forth in claim 9 wherein said compare unit determines that said count of successful voltage evaluation time periods is greater than N where N is an integer, and in response to said determination, enables said voltage suitable VDDOK flag to indicate that said adjustable supply voltage is suitable for said new requested performance level.

11. A method for changing a first value of clock frequency to a second value of clock frequency that is suitable for a requested performance level in an adaptive voltage scaling (AVS) system, said method comprising the steps of:
  integrating in an integrator circuit a slack time error signal from a hardware performance monitor of said adaptive voltage scaling (AVS) system;
  evaluating a suitability of said integrated slack time error signal for said requested performance level for at least N voltage evaluation time periods where N is an integer; and
  changing the first value of clock frequency to the second value of clock frequency when the integrated slack time error signal is within a predetermined range of limits.

12. The method as set forth in claim 11 further comprising the step of:
  enabling a voltage suitable VDDOK flag when said integrated slack time error signal is within a predetermined range of limits for at least N voltage evaluation time periods where N is an integer.

13. The method as set forth in claim 12 wherein said predetermined range of limits comprises a predetermined upper limit and a predetermined lower limit.

14. The method as set forth in claim 12 wherein a value of said integer N is two.

15. The method as set forth in claim 11 wherein said step of evaluating said suitability of said integrated slack time error signal for said requested performance level for at least N voltage evaluation time periods where N is an integer comprises the steps of:
  providing a control state machine in a voltage monitor that is capable of enabling an operation of said integrator circuit;
  associating a first timer with said control state machine;
  associating a second timer with said control state machine;
  associating a compare unit with said control state machine wherein said compare unit receives an output signal from said integrator circuit; and
  associating a counter unit with said control state machine and with said compare unit.

16. The method as set forth in claim 15 further comprising the step of:
  counting in said first timer a settable delay period VDD Evaluation Delay from a point in time when said control state machine receives a signal requesting a new performance level until a point in time when said control state machine enables said integrator circuit to begin integrating said slack time error signal.

17. The method as set forth in claim 16 further comprising the step of:
  counting in said second timer a period of time VDD Evaluation Time during which said integrator circuit performs an integration of said slack time error signal.

18. The method as set forth in claim 17 further comprising the step of:
  determining in said compare unit whether said output signal from said integrator circuit that represents said integrated slack time error signal after said VDD Evaluation Time has elapsed is within a predetermined range of limits.

19. The method as set forth in claim 18 further comprising the steps of:
  causing said counter unit to increment a count when said integrated slack time error signal is within said predetermined range of limits; and
  recording in said count how many successful voltage evaluation time periods have occurred.

20. The method as set forth in claim 19 further comprising the steps of:
  determining in said compare unit that said count of successful voltage evaluation time periods is greater than N where N is an integer; and
  in response to said determination, enabling said voltage suitable VDDOK flag to indicate that said adjustable supply voltage is suitable for said new requested performance level.

* * * * *